US012658363B2

(12) United States Patent
Katsuya

(10) Patent No.: US 12,658,363 B2
(45) Date of Patent: Jun. 16, 2026

(54) COIL

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 575 days.

(21) Appl. No.: 18/125,160

(22) Filed: Mar. 23, 2023

(65) Prior Publication Data

US 2023/0317371 A1 Oct. 5, 2023

(30) Foreign Application Priority Data

Mar. 29, 2022 (JP) ................................ 2022-054187

(51) Int. Cl.
*H01F 41/064* (2016.01)
*H01F 41/077* (2016.01)

(52) U.S. Cl.
CPC ......... *H01F 41/064* (2016.01); *H01F 41/077* (2016.01)

(58) Field of Classification Search
CPC ...... H01F 41/064; H01F 41/077; H01F 41/10; H01F 41/07; H01F 5/00; H01F 41/04; H02J 50/10
See application file for complete search history.

(56) References Cited

FOREIGN PATENT DOCUMENTS

| | | | | |
|---|---|---|---|---|
| CA | 2715398 A1 * | 8/2009 | ............... H01R 4/56 |
| DE | 102019113228 A1 | 11/2020 | |
| JP | 36-001124 | 1/1961 | |
| JP | 06-050330 | 7/1994 | |
| JP | 2010-042690 | 2/2010 | |
| JP | 2010-176886 | 8/2010 | |
| JP | 2012-186472 | 9/2012 | |
| JP | 2015-220357 | 12/2015 | |
| JP | 3210770 U * | 6/2017 | ........... H01F 41/086 |
| JP | 2018-207060 | 12/2018 | |
| JP | 2021-068815 | 4/2021 | |

OTHER PUBLICATIONS

Japanese Office action for Japanese Patent Application No. 2022-054187 mailed Dec. 19, 2023.

* cited by examiner

*Primary Examiner* — Mohamad A Musleh
(74) *Attorney, Agent, or Firm* — Amin, Turocy & Watson, LLP

(57) ABSTRACT

A coil includes: a wound conducting wire; and a terminal structure formed on an end of the conducting wire. The conducting wire is formed by bundling and twisting a plurality of strands. The strands are arranged longitudinally along a central axis of the coil. A method for manufacturing the coil includes: causing the end to pass through an internal space; then inserting a partition plate into a sleeve in a longitudinal direction so as to push the strands apart and arranging the strands in a first region and a second region; and then pinching the sleeve in a lateral direction and crushing the sleeve.

7 Claims, 4 Drawing Sheets

COIL

CROSS-REFERENCE TO RELATED APPLICATION

Priority is claimed on Japanese Patent Application No. 2022-054187, filed on Mar. 29, 2022, the contents of which are incorporated herein by reference.

BACKGROUND

Field of the Invention

The present invention relates to a coil.

Background

In recent years, in order to enable more people to secure easy access to affordable, reliable, sustainable, and advanced energy, research and development have been conducted on charging and power supply in vehicles equipped with secondary batteries that contribute to energy efficiency.

Coils used in contactless power transmission systems are known (see, for example, Japanese Unexamined Patent Application, First Publication No. 2015-220357, Japanese Unexamined Patent Application, First Publication No. 2010-042690, and Japanese Unexamined Utility Model application, First Publication No. H06-050330).

SUMMARY

In technology relating to charging and power supply in vehicles equipped with secondary batteries, since known coils are made of litz wires, it is difficult to perform end processing for electrically connecting a plurality of strands that constitute the litz wires to terminals.

An object of an aspect of the present invention is to provide a coil that facilitates end processing. Further, the aspect of the present invention contributes to energy efficiency.

A coil according to a first aspect of the present invention includes: a wound conducting wire; and a terminal structure formed on an end of the conducting wire, wherein the conducting wire is formed by bundling and twisting a plurality of strands, and the strands are arranged longitudinally along a central axis of the coil.

According to this configuration, the conducting wire is formed by bundling and twisting the plurality of strands, and the strands are arranged longitudinally along the central axis of the coil. Thus, a part of an inner surface of a sleeve penetrates an insulating coating from both sides of the end that has passed through the sleeve and directly bites into the strands, so that the end and the sleeve can be electrically connected to each other. Accordingly, a terminal structure can be formed without requiring a release agent to permeate and melt the insulating coating of the strand in an inner layer inside an outer layer, or without requiring the end and the sleeve serving as a terminal to be electrically connected to each other via solder. Accordingly, it is possible to provide a coil that facilitates end processing.

In a second aspect, diameters of the strands may be at least 0.20 mm and at most 0.45 mm.

According to this configuration, the diameters of the strands are at least 0.20 mm and at most 0.45 mm Thus, the diameters of the strands can be made within twice the skin depth of the strand in a case in which a working frequency is at least 85 kHz, which is used in a contactless power receiving and supply system. Accordingly, even in a case in which the coil is used when the skin depth is small and at relatively high frequencies where conduction is difficult inside the conducting wire, the diameter of the strand can be increased to the extent that an influence of a skin effect can be inhibited. It is possible to reduce the number of rows of the strands arranged longitudinally in a cross-section of the conducting wire. It is possible to effectively reduce uneven distribution of current density inside the conducting wire due to the skin effect and a proximity effect, thereby inhibiting AC resistance.

In a third aspect, the strands may be arranged in three rows or less along the central axis of the coil.

According to this configuration, the strands are arranged in three rows or less along the central axis of the coil. Thus, at the end, the strands arranged in an internal space of the sleeve can be arranged in two rows by dividing each row by a partition plate. All strands constituting the cross-section of the conducting wire can be brought into contact with the inner surface of the sleeve. Accordingly, the terminal structure can be formed on the end without requiring a release agent, solder, or the like.

In a fourth aspect, an insulating coating of the strands may have a melting point exceeding the melting point of solder.

According to this configuration, the insulating coating of the strands has the melting point exceeding the melting point of the solder.

Thus, heat resistance of the strands and the conducting wire can be improved. Accordingly, the coil can be used for applications that require heat resistance and durability such as a contactless power receiving and supply system, where a high voltage of tens of thousands of volts or more normally acts on the coil.

In a fifth aspect, the terminal structure may include a sleeve having an internal space through which the end passes, a blade protruding inward from an inner surface of the sleeve, and a partition plate dividing the internal space into a first region and a second region, and the strands may be arranged in the first region and the second region.

According to this configuration, the terminal structure is configured to include a sleeve having an internal space through which the end passes, a blade protruding inward from the inner surface of the sleeve, and a partition plate dividing the internal space into the first region and the second region. In addition, the strands are arranged in the first region and the second region. Thus, the strand arranged in the first region is electrically connected to the sleeve through contact with the blade passing through the insulating coating while arranged longitudinally between the partition plate and the blade. Accordingly, the terminal structure can be formed on the end of the conducting wire without requiring processing using a release agent, solder, or the like.

A sixth aspect of the present invention is a coil manufacturing method for manufacturing the coil, the method including: causing the end to pass through the internal space; then inserting the partition plate into the sleeve in a longitudinal direction so as to push the strands apart and arranging the strands in the first region and the second region; and then pinching the sleeve in a lateral direction and crushing the sleeve.

According to this configuration, the method for manufacturing a coil includes: causing the end to pass through the internal space, then inserting the partition plate into the sleeve in the longitudinal direction so as to push the strands apart and arranging the strands in the first region and the second region, and then pinching the sleeve in the lateral direction and crushing the sleeve. Thus, the blade can be made to penetrate the insulating coating formed on the strand and come into contact with a conductor covered with the insulating coating of the strand. In each of the first region and the second region, the strands can be arranged in a row in the longitudinal direction without overlapping each other in the lateral direction. Accordingly, the blade can be brought into contact with the conductor covered with the insulating coating in all the strands at the end. Thus, electrical connection between the end and the sleeve can be ensured without requiring processing using a release agent, solder, or the like. In addition, it is possible to provide the coil that facilitates end processing.

A contactless power supply device according to a seventh aspect of the present invention includes the coil.

According to this configuration, the contactless power supply device includes the coil. Thus, it is possible to provide the contactless power supply device that facilitates end processing.

A contactless power receiving device according to an eighth aspect of the present invention includes the coil.

According to this configuration, the contactless power receiving device includes the coil. Thus, it is possible to provide the contactless power receiving device that facilitates end processing.

A contactless power receiving and supply system according to a ninth aspect of the present invention includes the contactless power supply device and the contactless power receiving device.

According to this configuration, the contactless power receiving and supply system includes the contactless power supply device and the contactless power receiving device. Thus, it is possible to provide the contactless power receiving and supply system that facilitates end processing.

According to the aspect of the present invention, it is possible to provide the coil that facilitates end processing.

DESCRIPTION OF EMBODIMENTS

Embodiment

A coil 1 according to an embodiment of the present invention will be described below with reference to the drawings.

Figure 1:
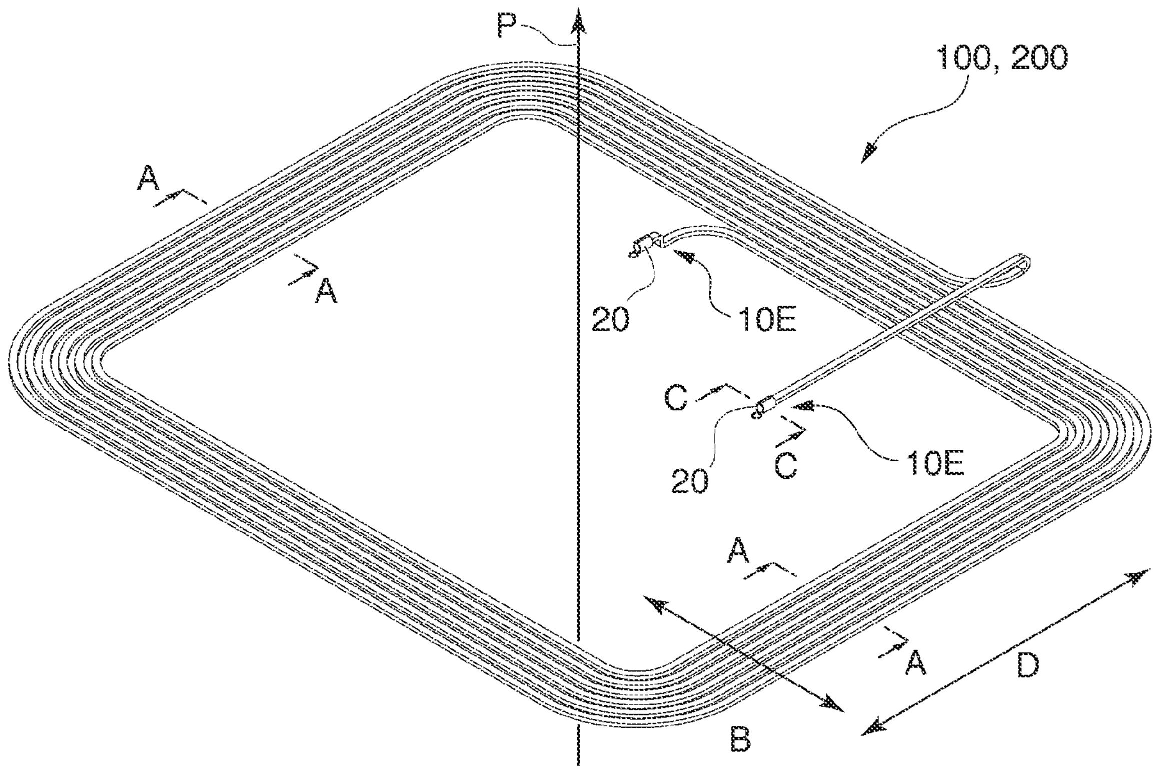
FIG. 1 is a perspective view showing a contactless power supply device or a contactless power receiving device including a coil according to an embodiment.
Figure 2:
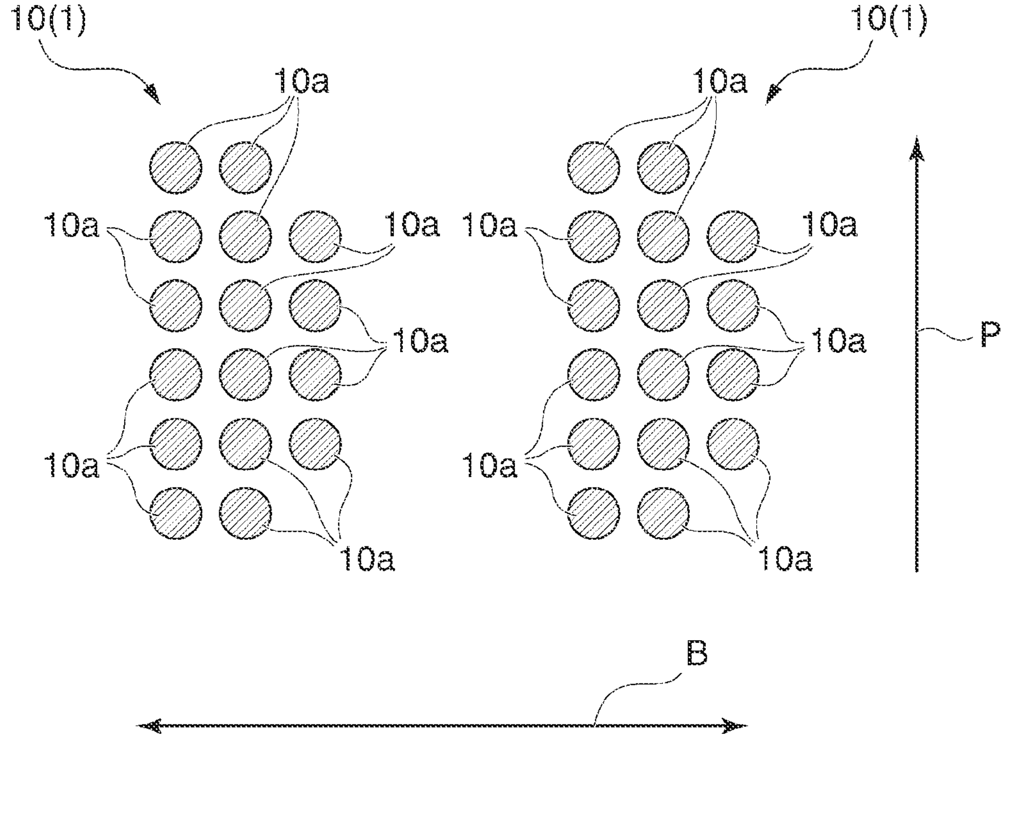
FIG. 2 is a cross-sectional view along arrow A in FIG. 1.
Figure 3:
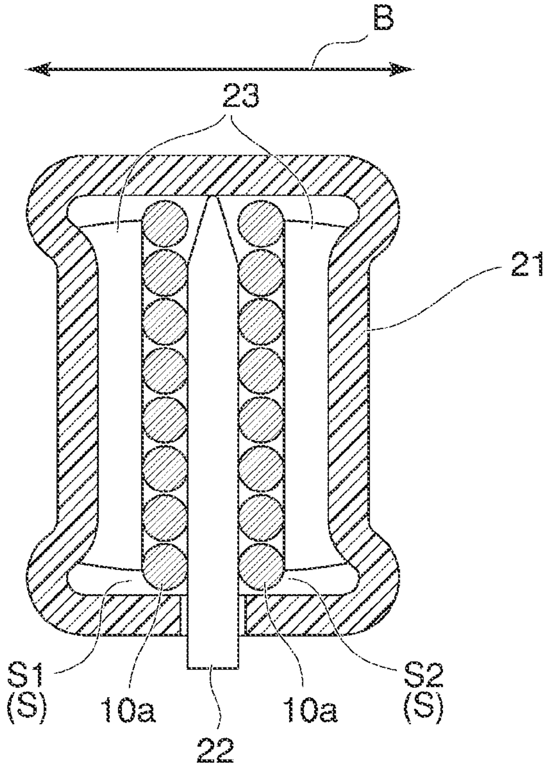
FIG. 3 is a cross-sectional view along arrow C in FIG. 1.
Figure 4:
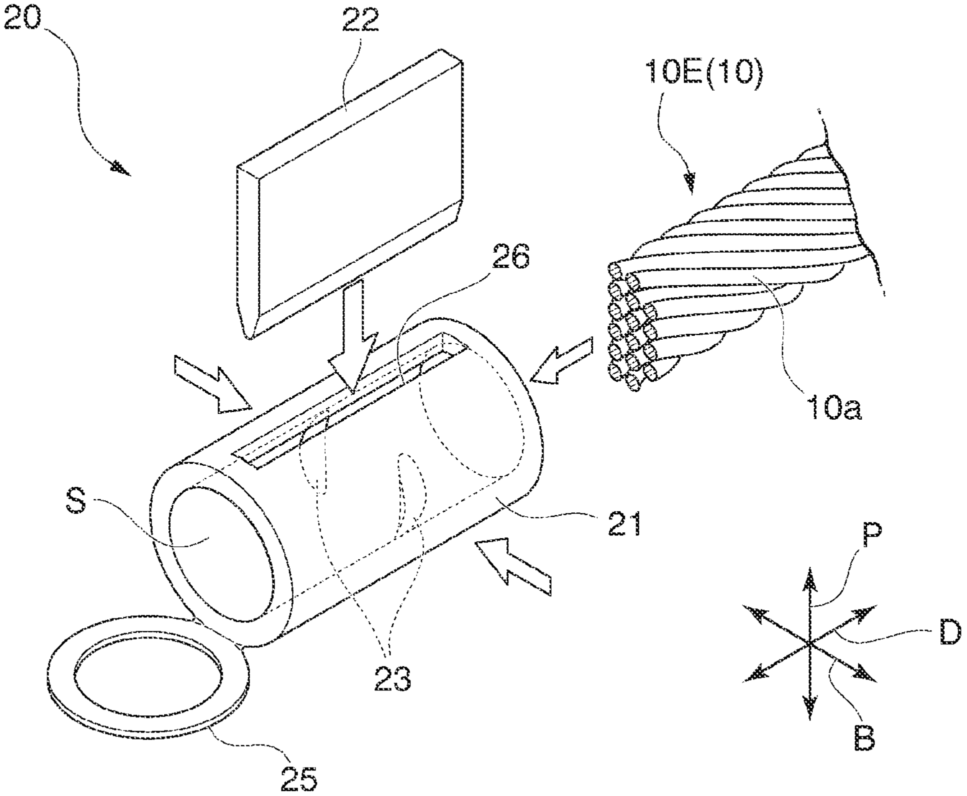
FIG. 4 is an explanatory diagram for explaining an assembling state of a terminal structure.

FIG. 1 is a perspective view showing a contactless power supply device 100 or a contactless power receiving device 200 including the coil 1 according to the embodiment. FIG. 2 is a cross-sectional view along arrow A in FIG. 1. FIG. 3 is a cross-sectional view along arrow C in FIG. 1. FIG. 4 is an explanatory diagram for explaining an assembling state of a terminal structure 20. In addition, FIG. 2 shows, as a representative, a cross-section of a conducting wire 10 for two turns, which is a cross-section of the conducting wire 10 of an n-th turn and the conducting wire 10 adjacent thereto.

Also, hereinafter, a direction along a central axis P of the coil 1 may be referred to as a longitudinal direction, and a direction perpendicular to the central axis P and perpendicular to an extending direction D of the conducting wire 10 may be referred to as a lateral direction B.

As shown in FIG. 1, the contactless power supply device 100 or the contactless power receiving device 200 according to the embodiment includes the coil 1 wound around the central axis P. Thus, it is possible to provide the contactless power supply device 100 or the contactless power receiving device 200 that facilitates end processing.

The coil 1 may be used in the contactless power supply device 100. The contactless power supply device 100 including the coil 1 may be provided near a road surface of a road.

The coil 1 may be used in the contactless power receiving device 200. The contactless power receiving device 200 including the coil 1 may be provided at a bottom portion of a vehicle traveling on the road.

The contactless power supply device 100 and the contactless power receiving device 200 are provided in a contactless power receiving and supply system disposed in a positional relationship in which they can come close to each other and face each other. The coil 1 may be used in the contactless power supply device 100. The coil 1 may be used in the contactless power receiving device 200. The coil 1 may be used in both the contactless power supply device 100 and the contactless power receiving device 200.

The contactless power receiving and supply system includes the contactless power supply device 100 including the coil 1 and the contactless power receiving device 200 including the coil 1. The contactless power supply device 100 and the contactless power receiving device 200 including the coil 1 are disposed in a positional relationship in which they face each other at a distance within an influence of magnetic field resonance. Thus, electric power can be wirelessly transmitted from the contactless power supply device 100 to the contactless power receiving device 200. In addition, it is possible to provide the contactless power receiving and supply system that facilitates end processing.

(Coil)

As shown in FIG. 1, the coil 1 includes the wound conducting wire 10 and the terminal structure 20 formed at an end 10E of the conducting wire 10.

As shown in FIG. 2, the conducting wire 10 is formed by bundling and twisting a plurality of strands 10*a*. Also, here, 16 strands 10*a* are arranged in three rows. In addition, FIG. 2 shows an arbitrary cross-section of the conducting wire 10 configured by twisting and bundling each of the strands 10*a*. Accordingly, each of the strands 10*a* is disposed at a different position depending on a cross-section thereof.

The coil 1 is obtained by winding the conducting wire 10. The conducting wire 10 is wound around the central axis P. The conducting wire 10 is wound seven turns around the central axis P, for example.

A distance between adjacent conducting wires 10 (a distance between a center of the n-th turn conducting wire 10 and a center of the n+1-th turn conducting wire 10) can be preferably about twice the width of the conducting wire 10. Thus, alternating current resistance can be reduced, ensuring a space factor.

The coil 1 can be wound in a spiral shape, preferably along the same plane. Thus, a size of the coil 1 in a direction along the central axis P can be restrained. Electromagnetic compatibility and output can be ensured by inhibiting parasitic capacitance and leakage electromagnetic waves.

The coil 1 may be wound in a rectangular shape along the same plane. Thus, the output can be effectively ensured while the size of the coil in the direction along the central axis P is kept small. Long sides of the rectangular shape are disposed in a traveling direction of the vehicle on which the contactless power receiving device 200 is mounted, and thus even in a case in which a relative positional relationship between the coil 1 of the contactless power supply device 100 and the coil 1 of the opposing contactless power receiving device 200 deviates, as long a transmission time of the electric power as possible can be secured.

(Conducting Wire)

The conducting wire 10 is made of a conductive material such as copper, aluminum, clad steel, or the like.

The conducting wire 10 is a twisted wire obtained by twisting and bundling the plurality of strands 10*a*.

As shown in FIG. 2, the conducting wire 10 is disposed in a posture in which the longitudinal direction of the cross-section (arrangement of the strands 10*a*) is aligned with the central axis P of the coil 1. Thus, it is possible to increase the number of turns by disposing the adjacent conducting wires 10 at appropriate intervals while ensuring a cross-sectional area of the conducting wire 10 in accordance with the electric power supplied to the conducting wire 10. Accordingly, it is possible to increase the output by increasing the space factor of the conductive wire and restrain the size of the coil in the direction along the central axis. In addition, a surface area of the conducting wire 10 can be increased, and cooling efficiency can be enhanced.

Here, as shown in FIG. 2, the strands 10*a* are arranged longitudinally along the central axis P of the coil 1 in a cross-sectional view perpendicular to the extending direction D of the conducting wire 10. In other words, when the conducting wire 10 is viewed in a cross-section perpendicular to the extending direction D of the conducting wire 10, a contour formed by the plurality of strands 10*a* has the maximum dimension in the longitudinal direction along the central axis P that is larger than the maximum dimension in the lateral direction B perpendicular to the central axis P. In this way, in the cross-section of the conducting wire 10, the strands 10*a* are arranged longitudinally along the central axis P of the coil 1. Thus, a sleeve 21 is crushed (crimped) in the lateral direction, and a portion of an inner surface of the sleeve 21 penetrates insulating coatings from both sides of the end 10E passed through the sleeve 21 and directly bites into the strands 10*a*, and thus, the end 10E and the sleeve 21 can be electrically connected to each other. Accordingly, the terminal structure 20 can be formed without requiring a release agent to be permeated in order to melt the insulation coatings of the strands 10*a* in an inner layer inside an outer layer, or the end 10E and the sleeve 21 serving as a terminal to be electrically connected to each other via solder.

Thus, the coil that facilitates end processing can be provided. In addition, since the width of the conducting wire 10 can be reduced, the conducting wire 10 can be tightly packed on the same plane and wound with a high space factor. Thus, outer dimensions of the coil 1 can be kept as small as possible while inner dimensions thereof can be made as large as possible. Accordingly, the coil 1 can be compact and have a high coupling coefficient. Further, in the cross-section of the conducting wire 10, an area ratio of a group of the strands 10*a* in the inner layer inside the outermost layer in the lateral direction B can be reduced, and thus it is possible to reduce uneven distribution of current density due to a proximity effect occurring between the adjacent strands 10*a* and a skin effect occurring between the adjacent conducting wires 10, thereby inhibiting AC resistance.

(Strand)

Each strand 10*a* is covered with the insulating coating (not shown).

The insulating coating of the strand 10*a* have a melting point exceeding a melting point of solder. For example, the strand 10*a* is covered with the insulating film made of a resin material having a melting point higher than that of solder (for example, a highly heat-resistant foam material such as PEEK or polyurethane). Thus, heat resistance of the strand 10*a* and the conducting wire 10 can be improved. Accordingly, it can be used for applications requiring heat resistance and durability such as a contactless power receiving and supply system in which a high voltage of tens of thousands of volts or more normally acts on the coil 1.

Diameters of the strands 10*a* are preferably at least 0.20 mm and at most 0.45 mm. In this way, the diameters of the strands 10*a* are set to at least 0.20 mm and at most 0.45 mm Thus, the diameters of the strands 10*a* can be made within twice the skin depths δ of the strands 10*a* in a case in which the frequency used is set to 85 kHz or higher, which is used in a contactless power receiving and supply system. Also, the skin depth δ may be a theoretical value calculated from an angular frequency of an AC current flowing through the conducting wire 10, electrical conductivity of the conducting wire 10, and magnetic permeability of the conducting wire 10. Accordingly, even in a case in which the skin depth δ is small and it is used at a relatively high frequency at which electric conduction is difficult to be made inside the conducting wire 10, the diameters of the strands 10*a* can be increased to the extent that the influence of the skin effect can be inhibited. In the cross-section of the conducting wire 10, the rows of the strands 10*a* arranged longitudinally can be reduced. It is possible to effectively reduce uneven distribution of current density inside the conducting wire due to the skin effect and the proximity effect, and to inhibit AC resistance.

The strands 10*a* can preferably be arranged in three rows or less along the central axis P of the coil 1. Thus, as shown in FIG. 3, at the end 10E, the strands 10*a* disposed in an internal space S of the sleeve 21 can be partitioned row by row by a partition plate 22 and arranged in two rows. All the strands 10*a* that form the cross-section of the conducting wire 10 can be brought into contact with the inner surface of the sleeve 21. Accordingly, the terminal structure 20 can be formed at the end 10E without requiring a release agent, solder, or the like.

Also, the number of rows of the strands 10*a* may be four or more. Even in a case in which the number of rows of the strands 10*a* is four or more, if a thickness of the partition plate 22 is changed in accordance with the number of rows of the strands 10*a*, the strands 10*a* of the end 10E can be disposed row by row.

(Terminal Structure)

As shown in FIG. 3, the terminal structure 20 includes the sleeve 21 having the internal space S through which the end 10E of the conducting wire 10 is passed, the partition plate 22 dividing the internal space S into a first region S1 and a second region S2, and blades 23 protruding inward from the inner surface of the sleeve 21. The strands 10*a* of the end 10E are divided and disposed in the first region S1 and the second region S2.

In this way, the strands 10*a* of the end 10E are divided and disposed in the first region S1 and the second region S2 partitioned by the partition plate 22. Thus, the strands 10*a* disposed in the first region S1 are electrically connected to the sleeve 21 through contact with the blades 23 penetrating the insulating coatings in a state in which they are disposed longitudinally between the partition plate 22 and the blades 23. Thus, the terminal structure 20 can be formed at the end 10E of the conducting wire 10 without requiring processing using a release agent, solder, or the like.

Also, the internal space S may be partitioned into a third region S3 in addition to the first region S1 and the second region S2 by two or more partition plates 22.

The sleeve 21 is a so-called crimp terminal. The sleeve 21 is made of a conductive material. The sleeve 21 may be formed by, for example, plating a base material made of brass, phosphor bronze, or the like with tin or the like as appropriate.

The sleeve 21 may be a cylindrical body of rotation or may have a quadrangular square tube shape.

The internal space S of the sleeve 21 has a cross-sectional shape larger than a cross-sectional shape of the end 10E of the conducting wire 10.

In a state before the sleeve 21 and the end 10E are pressed, the first region S1 of the sleeve 21 has a lateral width (a gap between the blade 23 and the partition plate 22) exceeding the diameters of the strands 10*a* and less than twice the diameters of the strands 10*a*.

In a state before the sleeve 21 and the end 10E are pressed, the second region S2 of the sleeve 21 has a lateral width (a gap between the blade 23 and the partition plate 22) exceeding the diameters of the strands 10*a* and less than twice the diameters of the strands 10*a*.

In a state before the sleeve 21 and the end 10E are pressed, the internal space S of the sleeve 21 has a lateral width obtained by adding the lateral width of the first region S1, the lateral width of the second region S2, and a lateral width (a thickness) of the partition plate 22.

In this way, the first region S1 and the second region S2 of the sleeve 21 each have the lateral width exceeding the diameters of the strands 10*a* and less than twice the diameters of the strands 10*a*. Thus, when the partition plate 22 is inserted into the sleeve 21, the strands 10*a* of the end 10E in the internal space S are pushed into the first region S1 and the second region S2, so that the strands 10*a* pushed into the first region S1 and the second region S2 can be arranged in a row. Each of the strands 10*a* arranged in a row is pierced through the insulating coatings by the blades 23 on the inner surface of the sleeve 21. Thus, the strands 10*a* and the sleeve 21 can be reliably connected to each other simply by pressing the sleeve 21 toward the end 10E without using a release agent, solder, or the like.

As shown in FIG. 4, the sleeve 21 may optionally have a tongue piece 25 with an opening through which a bolt for connecting the terminal structure 20 to a terminal block (not shown) is passed. The tongue piece 25 extends along an axial center of the sleeve 21.

The sleeve 21 has a slit 26 into which the partition plate 22 is inserted. The slit 26 is formed to extend linearly along the axial center of the sleeve 21 in a direction perpendicular to the axial center of the sleeve 21 (longitudinal direction) and perpendicular to the crimping direction (lateral direction B). Thus, the partition plate 22 can be inserted in the direction perpendicular to the crimping direction.

The partition plate 22 is a plate-like body. The partition plate 22 can preferably be made of a conductive material. The partition plate 22 can preferably be made of the same material as the sleeve 21. The thickness of the partition plate 22 may be approximately the same as the diameters of the strands 10*a*. The height of the partition plate 22 (a dimension in a direction in which it is inserted into the sleeve 21) may be approximately the same as an inner dimension of the internal space S and may be approximately the same as an outer diameter of the sleeve 21. The length of the partition plate 22 (a dimension along the axial center of the sleeve 21) may be approximately the same as a length of the sleeve 21 (a dimension along the axial center of the sleeve 21).

The partition plate 22 has a wedge-shaped tip 22*e*. Thus, the strands 10*a* of the end 10E arranged in the internal space S can be easily pushed apart, and the partition plate 22 can be easily inserted into the internal space S of the sleeve 21.

The blades 23 protrude inward from the inner surface of the sleeve 21.

The blades 23 can preferably be made of a conductive material. The blades 23 can preferably be of the same material as the sleeve 21.

Inner tips of the blades 23 are sharp so that they can shear and penetrate the insulating coatings.

The blades 23 extend in the direction perpendicular to the axial center of the sleeve 21 and perpendicular to the crimping direction (longitudinal direction). Also, the crimping direction is a lateral direction of the end 10E which is longitudinally elongated. Thus, the blades 23 can be opposed to respective side surfaces of the strands 10*a* arranged in a row. Accordingly, due to the crimping, the blades 23 can reliably penetrate the insulating coatings of the strands 10*a*.

The blades 23 are provided in pairs at opposing positions on the inner surface of the sleeve 21. Thus, when the sleeve 21 is crushed in the lateral direction, a shearing force acting on the strands 10*a* in the first region S1 from one of the paired blades 23 and a shearing force acting on the strands 10*a* in the second region S2 from the other of the paired blades 23 can be located on the same plane, and thus the shearing forces can be reliably applied to the insulating coatings of the strands 10*a*. Also, the number of pairs of blades 23 is not limited to one. The pairs of blades 23 may be more than two pairs.

(Method for Manufacturing Coil)

Next, a method for manufacturing the coil 1 will be described with reference to FIGS. 4 to 8.

Figure 5:
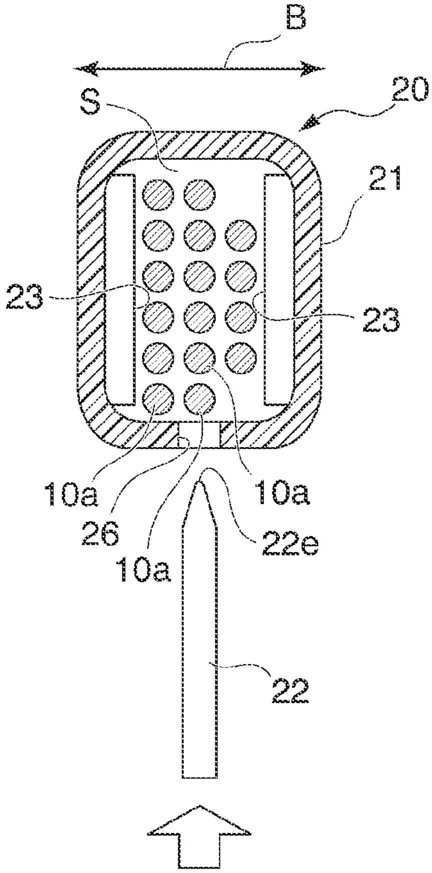
FIG. 5 is an explanatory diagram showing a state in which a partition plate is inserted into a sleeve.
Figure 6:
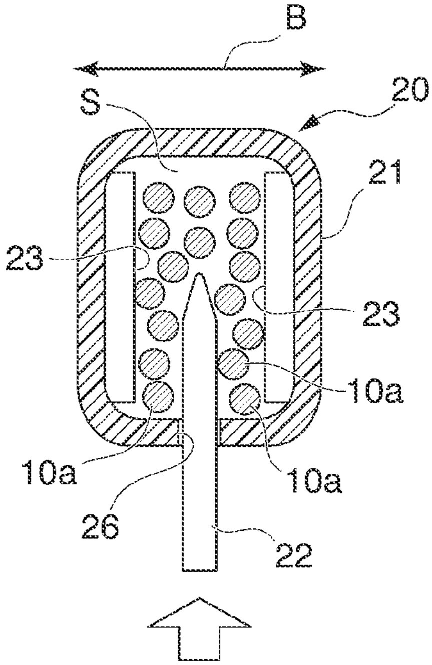
FIG. 6 is an explanatory diagram showing a state in which strands are pushed apart by the partition plate.
Figure 7:
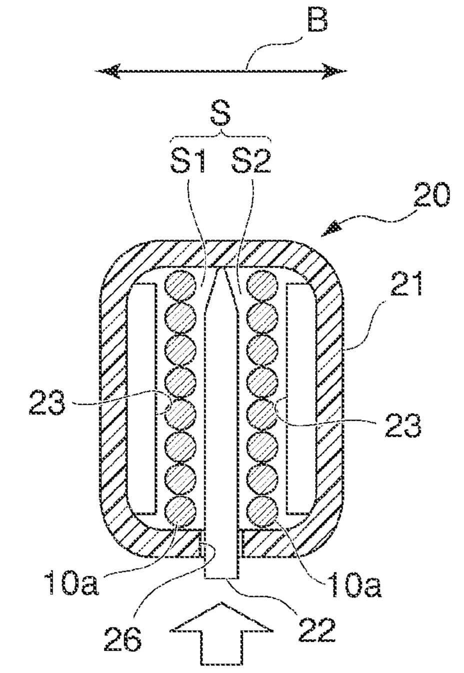
FIG. 7 is an explanatory diagram showing a state in which the partition plate divides an internal space to separate the strands.
Figure 8:
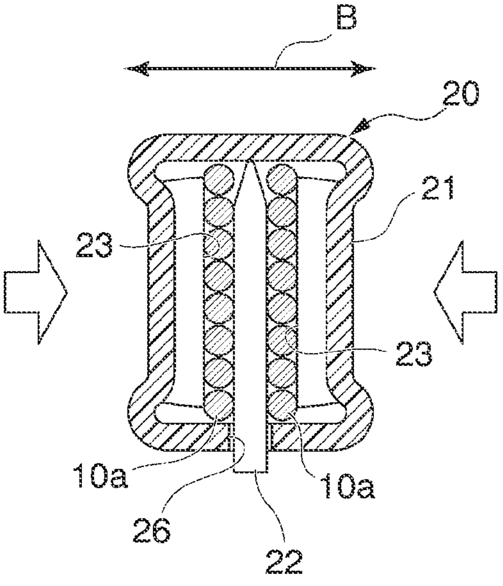
FIG. 8 is an explanatory diagram showing a state in which the sleeve is crushed from the sides.

FIG. 4 is an explanatory diagram for explaining an assembling state of the terminal structure 20. FIG. 5 is an explanatory diagram showing a state in which the partition plate 22 is inserted into the sleeve 21. FIG. 6 is an explanatory diagram showing a state in which the strands 10*a* are pushed apart by the partition plate 22. FIG. 7 is an explanatory diagram showing a state in which the internal space S is divided by the partition plate 22 to separate the strands 10*a*. FIG. 8 is an explanatory diagram showing a state in which the sleeve 21 is crushed from sides. Also, FIGS. 5 to 8 show a cross-section while the terminal structure 20 is assembled.

As shown in FIG. 4, the terminal structure 20 of the coil 1 includes the sleeve 21, the end 10E of the conducting wire 10 inserted into the internal space S of the sleeve 21, and the partition plate 22. The terminal structure 20 of the coil 1 can be manufactured by crimping the sleeve 21 in a state in which the end 10E is passed through the internal space S of the sleeve 21.

Specifically, first, the end 10E is passed through the internal space S.

After that, as shown in FIG. 5, the partition plate 22 is in a posture oriented in the longitudinal direction with the tip

22*e* facing the sleeve 21. Then, as shown in FIG. 6, the partition plate 22 is inserted into the slit 26 of the sleeve 21 in the longitudinal direction. Then, as shown in FIG. 7, while the strands 10*a* are pushed apart by the partition plate 22, the tip 22*e* of the partition plate 22 is brought close to or in contact with the inner surface of the sleeve 21, and the partition plate 22 is moved to a position at which the internal space S can be partitioned. In this manner, the strands 10*a* are arranged separately in the first region S1 and the second region S2. Also, the partition plate 22 may be inserted from above or below the sleeve 21.

After that, as shown in FIG. 8, the sleeve 21 is pinched and crushed in the lateral direction. In this case, using an appropriate crimping tool, an appropriate amount of crimping (a crimp width) is controlled so that the blades 23 can reliably penetrate the insulating coatings and the conducting wire 10 is not cut.

As described above, the method for manufacturing the coil 1 is performed by inserting the end 10E into the internal space S, then inserting the partition plate 22 into the sleeve 21 in the longitudinal direction to push the strands 10*a* apart to be arranged into the first region S1 and the second region S2, and then pinching and crushing the sleeve 21 in the lateral direction B.

Thus, the blades 23 can penetrate the insulating coatings formed on the strands 10*a* and come into contact with the conductors covered with the insulating coatings of the strands 10*a*. In each of the first region S1 and the second region S2, the strands 10*a* can be arranged in a row in the longitudinal direction without overlapping the strands 10*a* in the lateral direction. Accordingly, the blades 23 can be brought into contact with the conductors covered with the insulating coatings in all the strands 10*a*. Thus, electrical connection between the end 10E and the sleeve 21 can be ensured without requiring processing using a release agent, solder, or the like. In addition, it is possible to provide the coil that facilitates end processing.

Further, the technical scope of the present invention is not limited to the above embodiments, and various modifications can be made without departing from the scope of the present invention.

In addition, it is possible to appropriately replace the constituent elements in the above-described embodiment with well-known constituent elements without departing from the scope of the present invention, and the modifications described above may be combined as appropriate.

What is claimed is:

1. A coil comprising:

a wound conducting wire; and a terminal structure formed on an end of the conducting wire, wherein the conducting wire is formed by bundling and twisting a plurality of strands, the strands are arranged longitudinally along a central axis of the coil, the terminal structure includes a sleeve having an internal space through which the end passes, a blade protruding inward from an inner surface of the sleeve, and a partition plate dividing the internal space into a first region and a second region, and the strands are arranged in the first region and the second region.

2. The coil according to claim 1, wherein diameters of the strands are at least 0.20 mm and at most 0.45 mm.

3. The coil according to claim 1, wherein the strands are arranged in three rows or less along the central axis of the coil.

4. The coil according to claim 1, wherein an insulating coating of the strands has a melting point exceeding a melting point of solder.

5. A contactless power supply device comprising:

the coil according to claim 1.

6. A contactless power receiving device comprising:

the coil according to claim 1.

7. A contactless power receiving and supply system comprising:

the contactless power supply device according to claim 5 and the contactless power receiving device according to claim 6.

* * * * *